March 31, 1964   L. J. ABBOTT   3,126,571
VACUUM LAWN SWEEPER

Filed July 10, 1962                                     2 Sheets-Sheet 1

Lovell J. Abbott
INVENTOR.

BY *Clarence A. O'Brien*
*and Harvey B. Jackson*
Attorneys

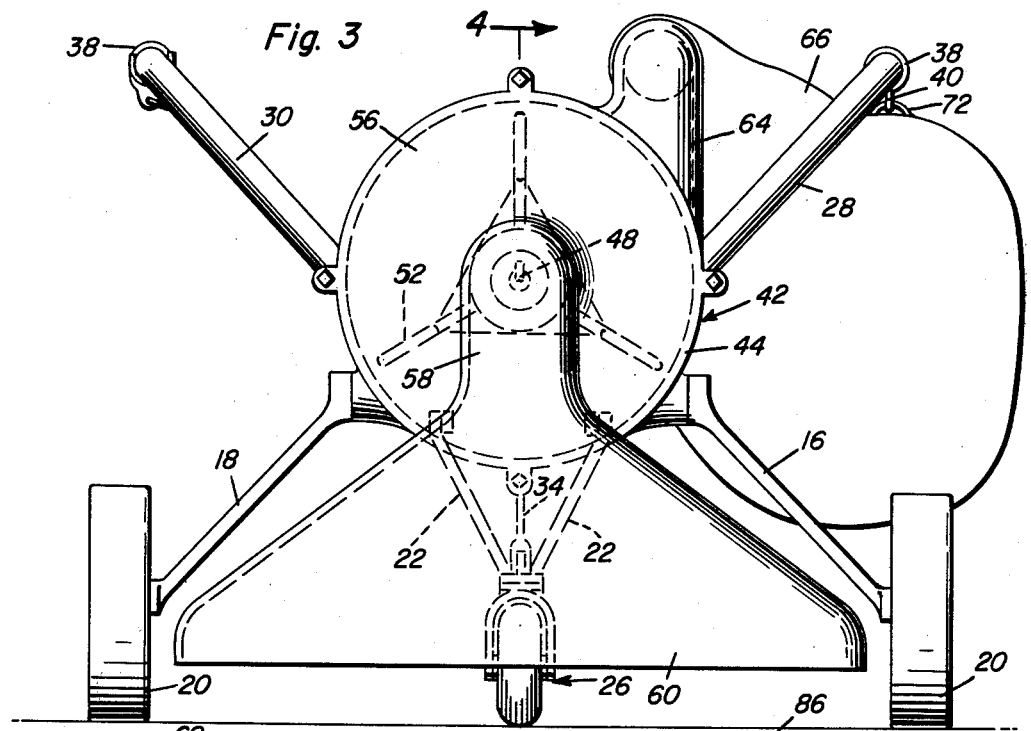
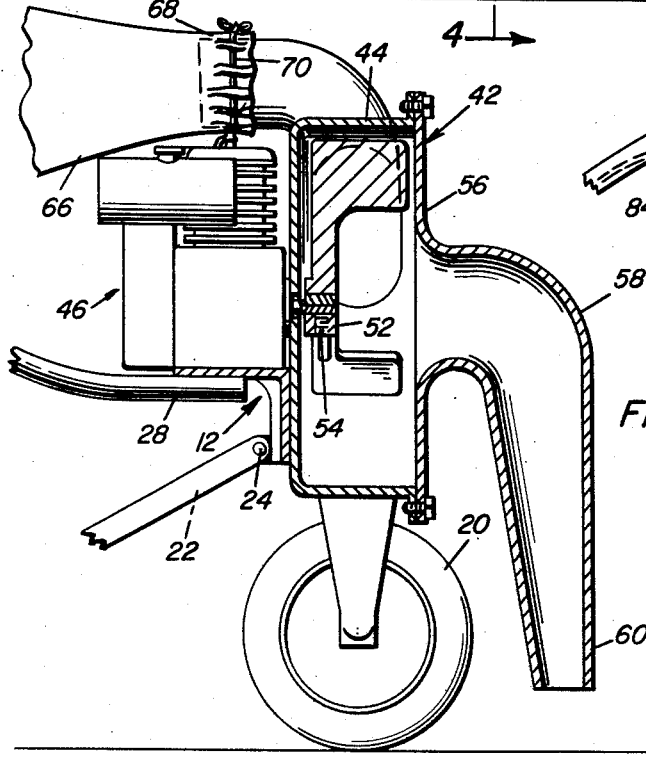
Lovell J. Abbott
INVENTOR.

United States Patent Office 3,126,571
Patented Mar. 31, 1964

3,126,571
VACUUM LAWN SWEEPER
Lovell J. Abbott, Hesperia, Mich.
(P.O. Box 3, Fremont, Mich.)
Filed July 10, 1962, Ser. No. 208,724
2 Claims. (Cl. 15—350)

This invention relates to a novel and useful lawn sweeper and more specifically to a sweeper assembly comprising a power-driven blower assembly which is mounted upon a depending tripod leg assembly having a pair of front wheels journaled for rotation about fixed axes extending transversely of the lawn sweeper and a single rear wheel which is of the caster type. The blower assembly of the lawn sweeper is provided with a depending intake snout which is flared at its lower end and forms an elongated inlet head disposed immediately forwardly of the front wheels of the sweeper and extending transversely of the sweeper.

Refuse may be drawn up into the intake or inlet snout by the blower assembly as the vacuum lawn sweeper moves over a lawn and the height of the lower end of the inlet snout relative to the ground over which the lawn sweeper is moving may be adjusted by vertical adjustment of the rear caster wheel relative to the two front wheels of the vacuum lawn sweeper.

Although the vacuum lawn sweeper of the instant invention is illustrated and described hereinafter as provided with a single rear leg, it is to be noted that a plurality of vertically adjustable rear legs may also be utilized although by using only three supporting wheels a more uniform height of the inlet snout may be maintained.

The main object of this invention is to provide a vacuum lawn sweeper which will be capable of picking up leaves, twigs, grass cuttings and other refuse from a lawn with a minimum amount of effort.

A further object of this invention is to provide a vacuum lawn sweeper in accordance with the preceding object whose inlet head may be easily adjusted relative to the lawn over which the lawn sweeper is being moved.

Still another object of this invention is to provide a vacuum lawn sweeper that will be easy to operate.

Still another object of this invention is to provide a vacuum lawn sweeper that includes a blower assembly readily adaptable to being driven by means of numerous types of prime movers.

A final object of this invention to be specifically enumerated herein is to provide a vacuum lawn sweeper in accordance with the preceding objects which will conform to conventional forms of manufacture, be of simple construction and readily adaptable to be manufactured in varying sizes so as to provide a device that will be economically feasible, long lasting and applicable for use on large lawn areas as well as the average size lawn.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged front elevational view of the lawn sweeper;

Figure 1:
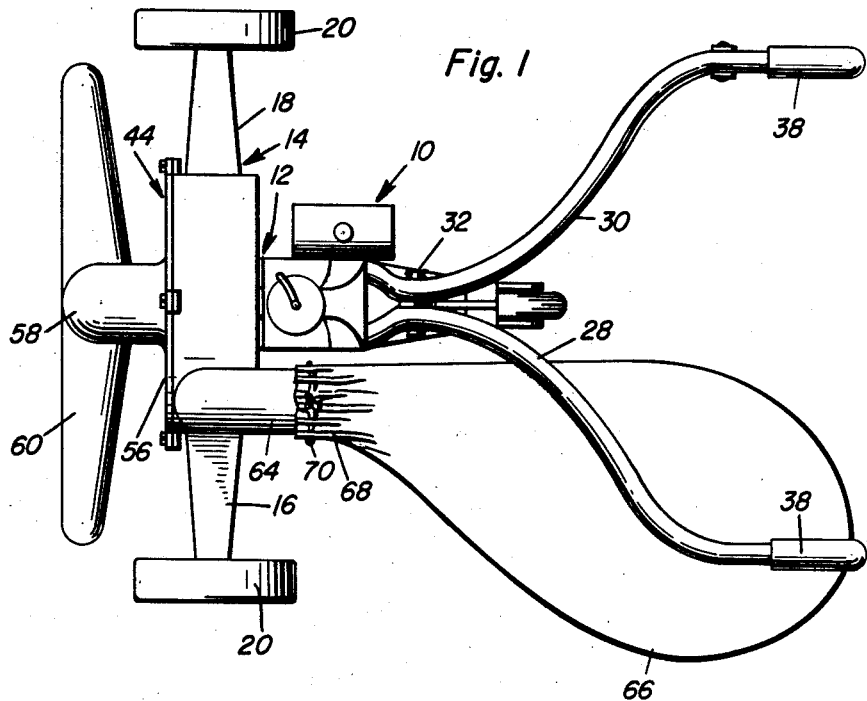
FIGURE 1 is a top plan view of the vacuum lawn sweeper of the instant invention.
Figure 2:
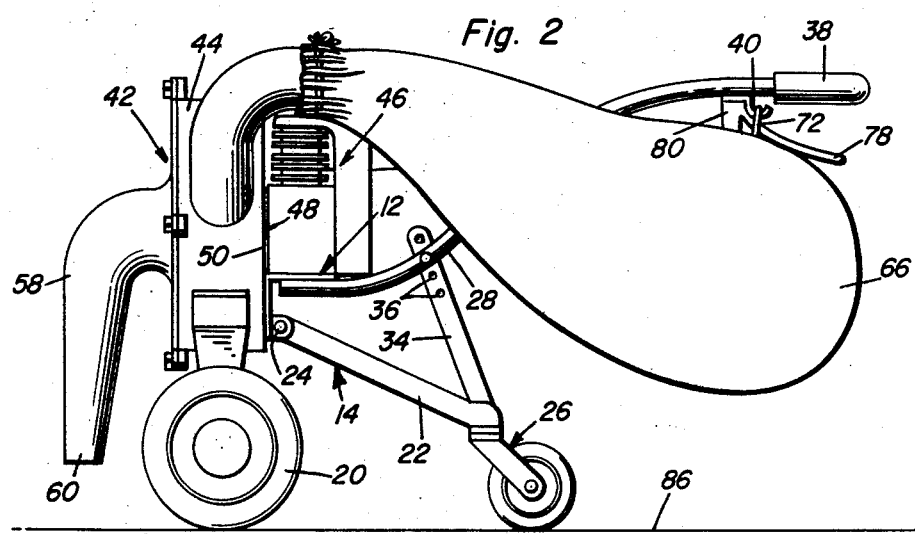
FIGURE 2 is a side elevational view of the embodiment illustrated in FIGURE 1.

FIGURE 4 is a fragmentary longitudinal vertical sectional view taken substantially upon the plane indicated by the section line 4—4 of FIGURE 3; and FIGURE 5 is a fragmentary side elevational view of one of the rearwardly projecting handles of the lawn sweeper showing the manner in which a control lever mounted thereon may be utilized to control the speed of the prime mover which is drivingly connected to the blower assembly of the lawn sweeper.

Referring now more specifically to the drawings the numeral 10 generally designates the lawn sweeper of the instant invention. The lawn sweeper 10 includes a main frame 12 and a depending tripod leg assembly generally referred to by the reference numeral 14. The tripod leg assembly includes a pair of depending front legs 16 and 18 which are secured at their upper ends to the main frame 12 and diverge downwardly toward opposite sides of the sweeper 10. A front ground engaging support wheel 20 is rotatably supported from the lower end of each front leg 16 and 18 and the front ground engaging support wheels 20 are mounted for rotation about coinciding axes.

The depending tripod leg assembly 14 also includes a rear leg assembly having a pair of downwardly convergent depending rear legs 22 which are pivotally secured at its upper end to the main frame 12 in any convenient manner such as by pivot pins 24. In this manner, the depending rear legs 22 are mounted for rotation about an axis extending transversely of the lawn sweeper 10 and of the rear legs 22. It will further be noted that the pivot pins 24 generally parallel a line extending between the front ground engaging support wheels 20. A caster wheel assembly generally referred to by the reference numeral 26 is secured to the lower ends of the rear legs 22 and it may be seen that the main frame 12 includes a pair of rearwardly projecting handles 28 and 30. The handles 28 and 30 are secured at their forward ends in any convenient manner such as by welding to opposite sides of the main frame 12 and curve toward each other immediately rearwardly of the main frame 12 and are secured together by means of a pivot pin 32. Although the pivot pin 32 secures the rear end portions of the handles 28 and 30 together, the handles 28 and 30 are spaced slightly apart at the points of their intersection with the pivot pin 32 and the upper end of an upstanding brace 34 is pivotally secured between the handles 28 and 30 by means of the pivot pin 32 while the lower end of the brace 34 is pivotally secured to the lower ends of the legs 22. It will be noted that the brace 34 includes a plurality of apertures or bores 36 which are spaced longitudinally of the upper end thereof for receiving the pivot pin 32. In this manner, the vertical height of the caster wheel assembly 26 may be adjusted.

The rear end of each of the handles 28 and 30 has a handgrip 38 mounted thereon and a hook 40 is mounted on the handle 28 immediately forwardly of the corresponding handgrip 38.

The blower assembly of the lawn sweeper 10 is generally referred to by the reference numeral 42 and includes a drum-like housing 44 which is horizontally disposed and extends longitudinally of the sweeper 10. A prime mover in the form of an internal combustion engine generally referred to by the reference numeral 46 is mounted on the main frame 12 and includes an output shaft 48 which projects through the rear end wall 50 of the housing 44 and has a rotor 52 mounted thereon. The rotor 52 is secured to the output shaft 48 by means of a setscrew 54 and the forward end wall 56 of the housing 44 has a depending snout 58 communicated with its central portion.

The snout 58 is flared at its lower end to form an elongated inlet head 60 which is disposed immediately forwardly of the front wheels 20 and extends transversely of the lawn sweeper 10.

The housing 44 includes an outlet neck 64 to which an inlet end of a refuse bag 66 is secured. The inlet end of the refuse bag 66 includes an inlet neck 68 and the inlet neck 68 is secured to the outlet nozzle 64 in any convenient manner such as by the tie string 70. The rear end of the refuse bag 66 remote from the inlet neck 68 thereof is closed and is provided with a loop 72 of any suitable material which may be engaged with the hook 40 carried by the handle 28.

With attention now directed to FIGURE 5 of the drawings in particular, a bellcrank 74 is pivotally secured to the handle 30 by means of a pivot pin 76 and the bellcrank 74 includes a first arm 78 which may be manipulated by the fingers of the hand of the operator engaged with the handgrip 38 on the handle 30 and a second arm 80 to which one end of a flexible pull member 82 is secured. The flexible pull member 82 passes through a grommet 84 which is secured in a suitable opening formed in the underside of the handle 30 and passes downwardly through the handle 30 and is operatively connected to the controls of the prime mover 46.

In operation, the prime mover 46 may be started and the lawn sweeper 10 may be moved over the lawn 86 for the purpose of picking up any refuse which may be disposed thereon. If it is desired to lower the inlet head 60, the rear caster wheel assembly 26 may be lowered relative to the front wheels 20 by securing the pivot pin 32 through the next highest aperture or bore 36 in the brace 34.

As soon as the refuse bag 66 becomes filled, the tie string 70 may be loosened, the inlet neck 68 may be removed from engagement with the outlet neck 64. Then, the bag 66 may be removed from engagement with the hook 40 and emptied in a suitable place before the bag 66 is again mounted upon the lawn sweeper 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vacuum lawn sweeper comprising a main frame including a pair of rearwardly directed handles and a depending tripod leg assembly having a pair of depending front legs and at least one depending rear leg assembly, a pair of support wheels rotatably supported at the lower end portions of said front legs and a single caster wheel rotatably supported at the lower end portion of said rear leg assembly, said rear leg assembly comprising a pair of rearwardly convergent legs pivotally secured at their forward ends to said main frame for rotation about generally aligned horizontally disposed axes extending transversely of said main frame and a depending brace pivotally secured at its lower end to the rear ends of said convergent legs and having a plurality of longitudinally spaced bores formed transversely through its upper end, said rearwardly directed handles, at points spaced rearwardly of said main frame, being disposed closely adjacent each other and interconnected by means of a shank-type fastener secured through the adjacent portions of said handles, the upper end of said depending brace passing between said adjacent portions of said handles with said fastener passing through a selected one of said bores and thereby serving the dual function of interconnecting said handles and adjustably supporting said depending brace, a blower assembly supported from said main frame and including an inlet and an outlet, motor means drivingly connected to said blower assembly, said blower assembly inlet including a depending inlet snout which is flared at its lower end forming an elongated inlet head generally paralleling said axes of rotation of said pair of support wheels and disposed slightly forwardly of the latter, a collection bag having an inlet secured to said blower assembly outlet, said bag, remote from its inlet being suspended from at least one of said handles adjacent the rear end thereof.

2. The combination of claim 1 wherein said blower assembly outlet opens rearwardly of said blower and is generally horizontally aligned with the rear ends of said handles, said collection bag being elongated and generally horizontally disposed and having, on an upper portion thereof, remote from its inlet, means removably supported from at least one of said handles adjacent the rear end thereof with said bag being slightly rearwardly and downwardly inclined, said one handle, rearwardly of said adjacent portions of said handles curving upwardly and outwardly in order to provide an area immediately thereunder through which said bag may extend.

References Cited in the file of this patent

UNITED STATES PATENTS

| | | |
|---|---|---|
| 1,314,693 | Orr | Sept. 2, 1919 |
| 2,172,973 | Hays et al. | Sept. 12, 1939 |
| 2,590,734 | Strong | Mar. 25, 1952 |
| 2,605,117 | Hooz et al. | July 29, 1952 |
| 2,918,694 | Tarrant | Dec. 29, 1959 |